United States Patent
Lee

(10) Patent No.: US 11,854,177 B2
(45) Date of Patent: Dec. 26, 2023

(54) IMAGE SPLICING METHOD

(71) Applicant: Acer Incorporated, New Taipei (TW)

(72) Inventor: Yen-Cheng Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 226 days.

(21) Appl. No.: 17/317,910

(22) Filed: May 12, 2021

(65) Prior Publication Data

US 2022/0327673 A1 Oct. 13, 2022

(30) Foreign Application Priority Data

Apr. 12, 2021 (TW) ................................ 110113066

(51) Int. Cl.
*G06T 5/50* (2006.01)
*G06T 7/11* (2017.01)
(Continued)

(52) U.S. Cl.
CPC ................ *G06T 5/50* (2013.01); *G06T 5/005* (2013.01); *G06T 7/11* (2017.01); *G06T 7/33* (2017.01); *G06T 2207/20021* (2013.01); *G06T 2207/20081* (2013.01); *G06T 2207/20084* (2013.01); *G06T 2207/20132* (2013.01); *G06T 2207/20221* (2013.01); *G06T 2207/30004* (2013.01)

(58) Field of Classification Search
CPC .... G06T 3/40; G06T 5/00; G06T 5/50; G06T 5/005; G06T 7/11; G06T 7/33; G06T 2207/20021; G06T 2207/20081; G06T 2207/20084; G06T 2207/20132; G06T 2207/20221; G06T 2207/30004; G06T 3/4038
See application file for complete search history.

(56) References Cited

U.S. PATENT DOCUMENTS 10,115,178 B2 * 10/2018 Tamura .................... G06T 11/60
10,699,377 B2 * 6/2020 Yuan ..................... G06T 3/4038
(Continued)

FOREIGN PATENT DOCUMENTS

CN 100423536 10/2008
CN 103985133 8/2014
(Continued)

*Primary Examiner* — Edward F Urban
*Assistant Examiner* — Benedict E Lee
(74) *Attorney, Agent, or Firm* — JCIPRNET

(57) ABSTRACT

Provided is an image splicing method, including the following. A to-be-predicted image is divided into first and second cropped images. An overlap region exists between the first and second cropped images. The overlap region is divided into first and second sub-overlap regions. A first image region that does not include the second sub-overlap region is found in the first cropped image, and a second image region that does not include the first sub-overlap region is found in the second cropped image. First and second prediction result images respectively corresponding to the first and second cropped images are generated. A first prediction image region corresponding to the first image region is found in the first prediction result image, and a second prediction image region corresponding to the second image region is found in the second prediction result image. The first and second prediction image regions are spliced into a spliced image.

6 Claims, 11 Drawing Sheets

(51) Int. Cl.
 *G06T 7/33* (2017.01)
 *G06T 5/00* (2006.01)

(56) References Cited

U.S. PATENT DOCUMENTS

| | | | |
|---|---|---|---|
| 11,494,877 B2* | 11/2022 | Zhang | G06T 11/008 |
| 2006/0256397 A1* | 11/2006 | Cui | H04N 1/3876 |
| | | | 358/450 |
| 2016/0259990 A1* | 9/2016 | Yamanaka | G06V 10/462 |
| 2019/0197340 A1 | 6/2019 | Li et al. | |
| 2019/0251663 A1* | 8/2019 | Yuan | G06T 3/4038 |
| 2020/0327653 A1 | 10/2020 | Leordeanu et al. | |
| 2021/0049795 A1* | 2/2021 | Cao | G06T 11/005 |
| 2021/0337118 A1* | 10/2021 | Adsumilli | H04N 23/611 |

FOREIGN PATENT DOCUMENTS

| | | |
|---|---|---|
| CN | 106408573 | 2/2017 |
| CN | 107665492 | 11/2020 |
| TW | 201305865 | 2/2013 |

* cited by examiner

IMAGE SPLICING METHOD

CROSS-REFERENCE TO RELATED APPLICATION

This application claims the priority benefit of Taiwanese application No. 110113066, filed on Apr. 12, 2021. The entirety of the above-mentioned patent application is hereby incorporated by reference herein and made a part of this specification.

BACKGROUND

Technical Field

The disclosure relates to an image processing technology; particularly, the disclosure relates to an image splicing method.

Description of Related Art

Currently, in fields related to smart healthcare, it is often required to establish a system that assists medical doctors with identification, judgment, or evaluation on medical images through deep learning. However, data set for training often has characteristics of small quantity, high resolution, and presence of numerous identical objects in one single medical image. Therefore, during the training phase, medical images are often divided to increase the amount of training data in the training data set.

Generally speaking, after division and prediction, the medical images still need to be spliced back into the original image size. In addition, the splicing process usually needs to be completed through some complex algorithms. Moreover, without a proper design of the splicing process, serious distortion may be present in the spliced image.

Therefore, for those skilled in the art, how to design a simple image splicing mechanism with low distortion is an issue to work on.

SUMMARY

The disclosure provides an image splicing method, which may solve the above technical problem.

The disclosure provides an image splicing method, adapted for an image processing device. The method includes the following. A to-be-predicted image is obtained, and the to-be-predicted image is divided into at least a first cropped image and a second cropped image. A first overlap region exists between the first cropped image and the second cropped image. The first overlap region is divided into a first sub-overlap region closer to the first cropped image and a second sub-overlap region closer to the second cropped image. A first image region that does not includes the second sub-overlap region is found in the first cropped image, and a second image region that does not include the first sub-overlap region is found in the second cropped image. A prediction operation is individually performed on the first cropped image and the second cropped image to generate a first prediction result image and a second prediction result image respectively corresponding to the first cropped image and the second cropped image. A first prediction image region corresponding to the first image region is found in the first prediction result image, and a second prediction image region corresponding to the second image region is found in the second prediction result image. At least the first prediction image region and the second prediction image region are spliced into a spliced image. A first relative position between the first prediction image region and the second prediction image region in the spliced image corresponds to a second relative position between the first image region and the second image region in the to-be-predicted image.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
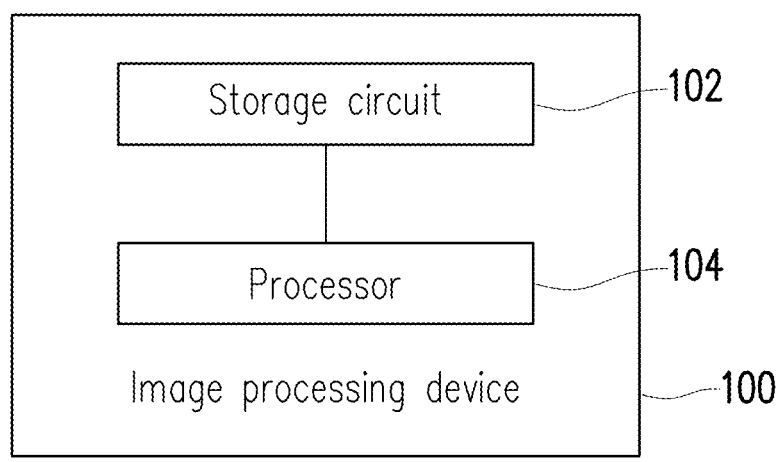
FIG. 1 is a schematic diagram of an image processing device according to an embodiment of the disclosure.

With reference to FIG. 1, which is a schematic diagram of an image processing device according to an embodiment of the disclosure, in different embodiments, the image processing device 100 includes, for example but not limited to, various servers, computer devices, and/or smart devices.

As shown in FIG. 1, an image processing device 100 may include a storage circuit 102 and a processor 104. The storage circuit 102 is, for example, any type of fixed or mobile random access memory (RAM), read-only memory (ROM), flash memory, hard disk or other similar devices or a combination of these devices, and may be configured to record a plurality of programming codes or modules.

The processor 104 is coupled to the storage circuit 102, and may be a general-purpose processor, a special-purpose processor, a conventional processor, a digital signal processor, a plurality of microprocessors, one or more microprocessors combined with a digital signal processor core, a controller, a microcontroller, an application specific integrated circuit (ASIC), a field programmable gate array (FPGA), any other integrated circuit, a state machine, a processor based on Advanced RISC Machine (ARM) and the like.

In the embodiment of the disclosure, the processor 104 may access the modules or programming codes recorded in the storage circuit 102 to realize the image splicing method proposed by the disclosure, which will be described in detail as follows.

Since medical images are of high privacy, high difficulty of labeling, and a relatively small number of cases, the number of data sets tend to be relatively small in data collection. In cell culture, taking calculation of area coverage of cells in a culture medium as an example, since the cells in a single image are of a great number and labeling thereof is time-consuming, it is relatively difficult to obtain a great number of data sets. However, because of the multitude of cells in a single image, if the image is divided into several smaller images for training and prediction, it should be able to alleviate the insufficiency of data in the data set.

Generally speaking, mainly in a deep learning mechanism, various features in a screen are captured, each combined with a weight value. In addition, an optimal weight ratio is found through the training data set with correct answers marked in advance to accordingly perform a prediction on a to-be-predicted image lastly.

However, it is inevitable that, during image division, some objects that could have been predicted becomes incomplete as a result of the image division and thus cannot be detected. Therefore, the division is usually performed so that an overlap region exists between each of the divided images. In this way, detection of each to-be-predicted object may be ensured to the maximum extent.

Figure 2:
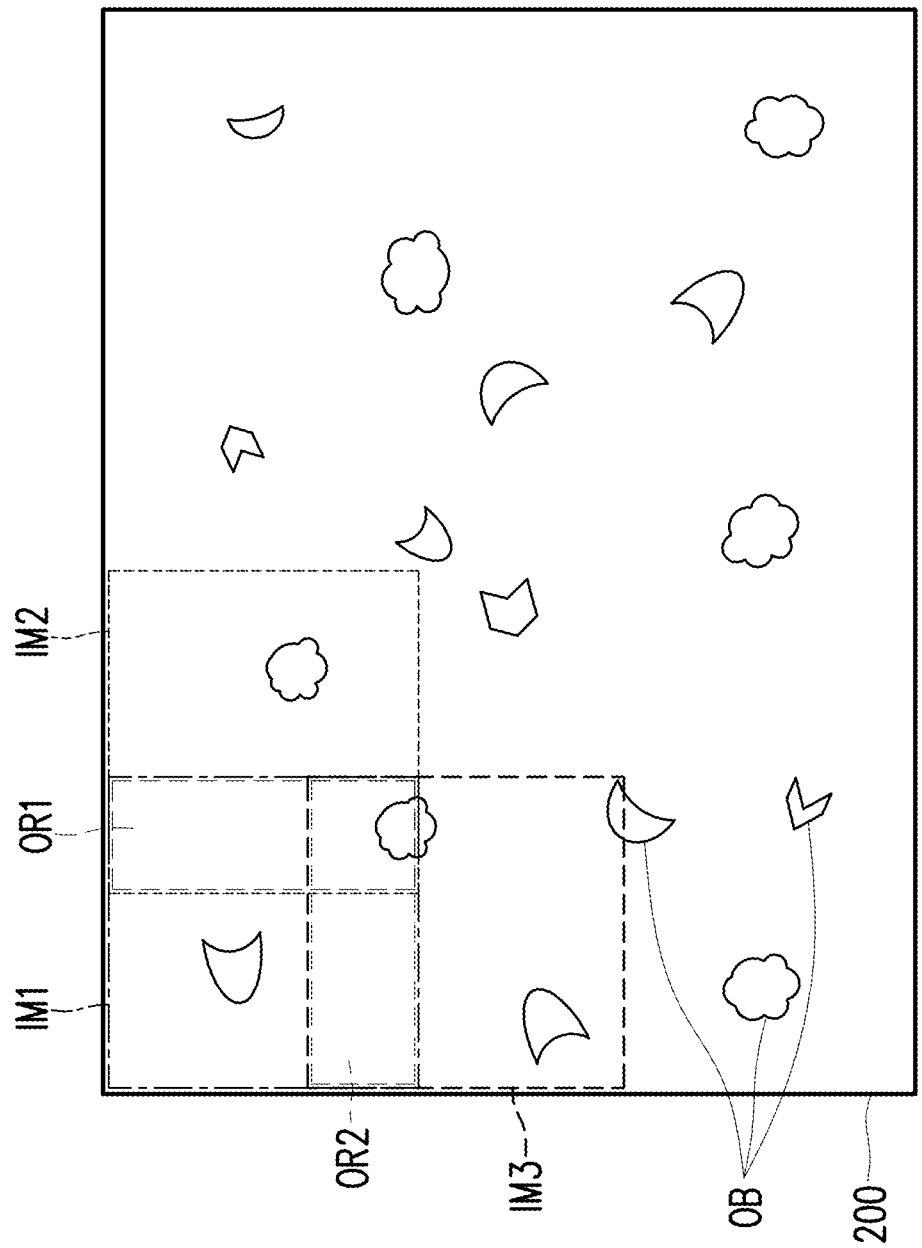
FIG. 2 is a schematic diagram showing a to-be-predicted image divided according to an embodiment of the disclosure.

With reference to FIG. 2, which is a schematic diagram showing a to-be-predicted image divided according to an embodiment of the disclosure, a to-be-predicted image 200 in FIG. 2 is, for example but not limited to, the aforementioned medical image or another image to be divided to augment the training data.

As shown in FIG. 2, the to-be-predicted image 200 may include a plurality of to-be-predicted objects OB. In this embodiment, the to-be-predicted image 200 is an 800×600 grayscale image. The image processing device 100 needs to divide the to-be-predicted image 200 into a plurality of W×H cropped images (W and H are respectively the width and height of each cropped image).

In an embodiment, when the processor 104 obtains the to-be-predicted image 200, a W×H rectangular window may first be established taking an upper left corner of the to-be-predicted image 200 (coordinates being (0, 0), for example) as a reference point. In addition, an image region covered by the rectangular window is taken as a first cropped image IM1.

After that, the processor 104 may shift the rectangular window rightward by a horizontal movement range (referred to as CW), and an image region covered by the shifted rectangular window is taken as a second cropped image IM2. In different embodiments, CW may be set to be smaller than the pixel number of W depending on the needs of the designer. In addition, in the case of FIG. 2, assuming that coordinates of an upper left corner pixel of the first cropped image IM1 are represented as $(x_a, y_a)$, and coordinates of an upper left corner pixel of the second cropped image IM2 are represented as $(x_b, y_b)$, then it can be known that $y_a = y_b$ and $x_b - x_a = CW$. Nonetheless, the disclosure is not limited thereto.

In other embodiments, the processor 104 may continue to shift the rectangular window rightward to find other cropped images on the right side of the second cropped image IM2. In addition, although the first cropped image IM1 and the second cropped image IM2 have the same size, a size (width, in particular) of the rightmost cropped image may be smaller than those of the other cropped images (e.g., the first cropped image IM1 and the second cropped image IM2) with the same height.

In some embodiment, for the rightmost cropped image to serve for subsequent prediction operation, the processor 104 may augment the rightmost cropped image to the same size as the first cropped image IM1, and the augmented part may be filled with a specific value (e.g., 0) by the processor 104. Nonetheless, the disclosure is not limited thereto. For other cropped images with a smaller size, the processor 104 may also perform the augmentation to adjust the cropped images to the same size as the first cropped image IM1. Nonetheless, the disclosure is not limited thereto.

In addition, after the processor 104 finds a cropped image with the same height as the first cropped image IM1, the rectangular window may first be restored to a position corresponding to the first cropped image IM1, then the mentioned rectangular window may be moved vertically downward by a vertical movement range (referred to as CH), and an image region covered by the rectangular window moved downward may be taken as a third cropped image IM3. In different embodiments, CH may be set to be smaller than the pixel number of H depending on the needs of the designer. In addition, in the case of FIG. 2, assuming that the coordinates of the upper left corner pixel of the first cropped image IM1 are represented as $(x_a, y_a)$, and coordinates of an upper left corner pixel of the third cropped image IM3 are represented as $(x_c, y_c)$, then it can be known that $x_a = x_c$ and $y_c - y_a = CH$. Nonetheless, the disclosure is not limited thereto.

In other embodiments, the processor 104 may continue to shift the rectangular window CW rightward to find other cropped images on the right side of the third cropped image IM3.

After the processor 104 finds a cropped image with the same height as the third cropped image IM3, the rectangular window may first be restored to a position corresponding to the third cropped image IM3, then the rectangular window may be moved vertically downward by CH to obtain other cropped images below the third cropped image IM3. The above mechanism may be continually repeated until the to-be-predicted image 200 is completely divided into a plurality of cropped images. Nonetheless, the disclosure is not limited thereto.

As shown in FIG. 2, when CW is smaller than W and CH is smaller than H, an overlap region exists between adjacent cropped images. For example, a first overlap region OR1 exists between the first cropped image IM1 and the second cropped image IM2, and a second overlap region OR2 exists between the first cropped image IM1 and the third cropped image IM3.

After that, the processor 104 may, for example, perform a prediction operation on each cropped image of the to-be-predicted image 200 to generate a prediction result image corresponding to each cropped image.

In an embodiment, the prediction result image corresponding to each cropped image is, for example, a binary image. For example, in each prediction result image, a pixel corresponding to the to-be-predicted objects OB may be represented as a first value (e.g., 1), and a pixel not corresponding to the to-be-predicted object OB may be represented as a second value (e.g., 0). Nonetheless, the disclosure is not limited thereto.

Since an overlap region exists between adjacent cropped images, after the prediction result image of each cropped image is obtained, a series of complex calculations, data search and matching are usually required to confirm correctness of each detectable object in the overlap region. In this case, it takes more time to splice each prediction result image. However, if the overlap region is directly overwritten without matching, a corresponding spliced image is prone to errors occurring at places corresponding to boundaries between the cropped images.

Figure 3:
FIG. 3 is a comparison diagram of a spliced image according to an embodiment of the disclosure.

Reference may be made to FIG. 3, which is a comparison diagram of a spliced image according to an embodiment of the disclosure. In FIG. 3, a spliced image 311 is, for example, a splicing result generated by directly overwriting the overlap region, and a spliced image 312 is, for example, the correct splicing result. As shown by the spliced image 311 and the spliced image 312, many places (e.g., circled parts) are present in the spliced image 311 that are different in the spliced image 312. Accordingly, without a properly designed mechanism for splicing the prediction result images, distortion may be present in the splicing result.

In view of this, the disclosure proposes an image splicing method, which may solve the above problem.

Figure 4:
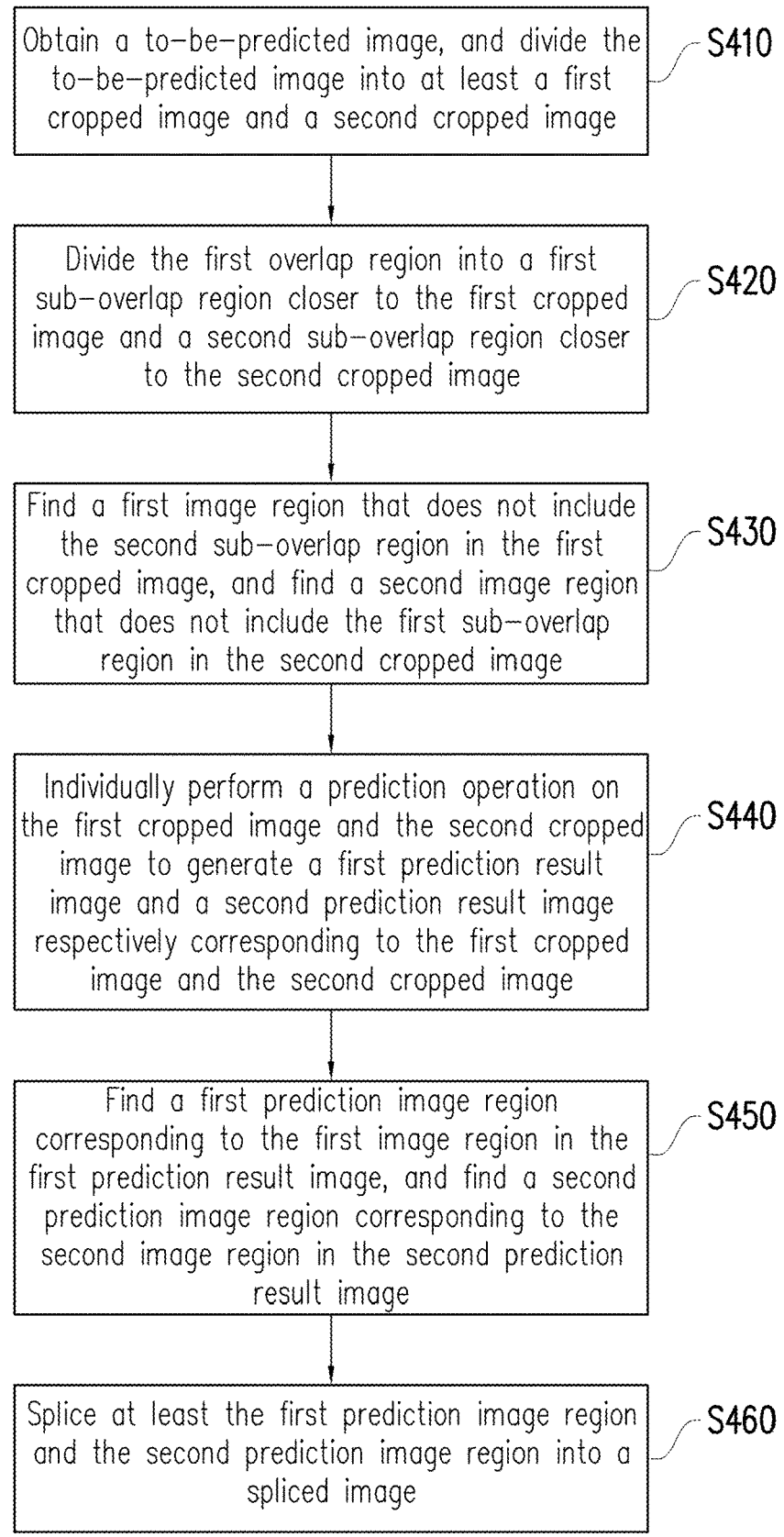
FIG. 4 is a flowchart of an image splicing method according to an embodiment of the disclosure.

With reference to FIG. 4, which is a flowchart of an image splicing method according to an embodiment of the disclosure, the method in this embodiment may be executed by the image processing device 100 of FIG. 1. Hereinafter, details of each step of FIG. 4 will be described in accompany with the elements shown in FIG. 1. In addition, to make the concept in the disclosure more comprehensible, the application scenario shown in FIG. 5 is adopted for further description in the following.

First, in step S410, the processor 104 may obtain a to-be-predicted image 510, and divide the to-be-predicted image 510 into at least a first cropped image 511 and a second cropped image 512. For ease of description, it is assumed in FIG. 5 that the to-be-predicted image 510 is divided into two cropped images of equal size (i.e., the first cropped image 511 and the second cropped image 512), but the disclosure is not limited thereto. In addition, as shown in FIG. 5, a first overlap region 520 exists between the first cropped image 511 and the second cropped image 512.

Figure 5:
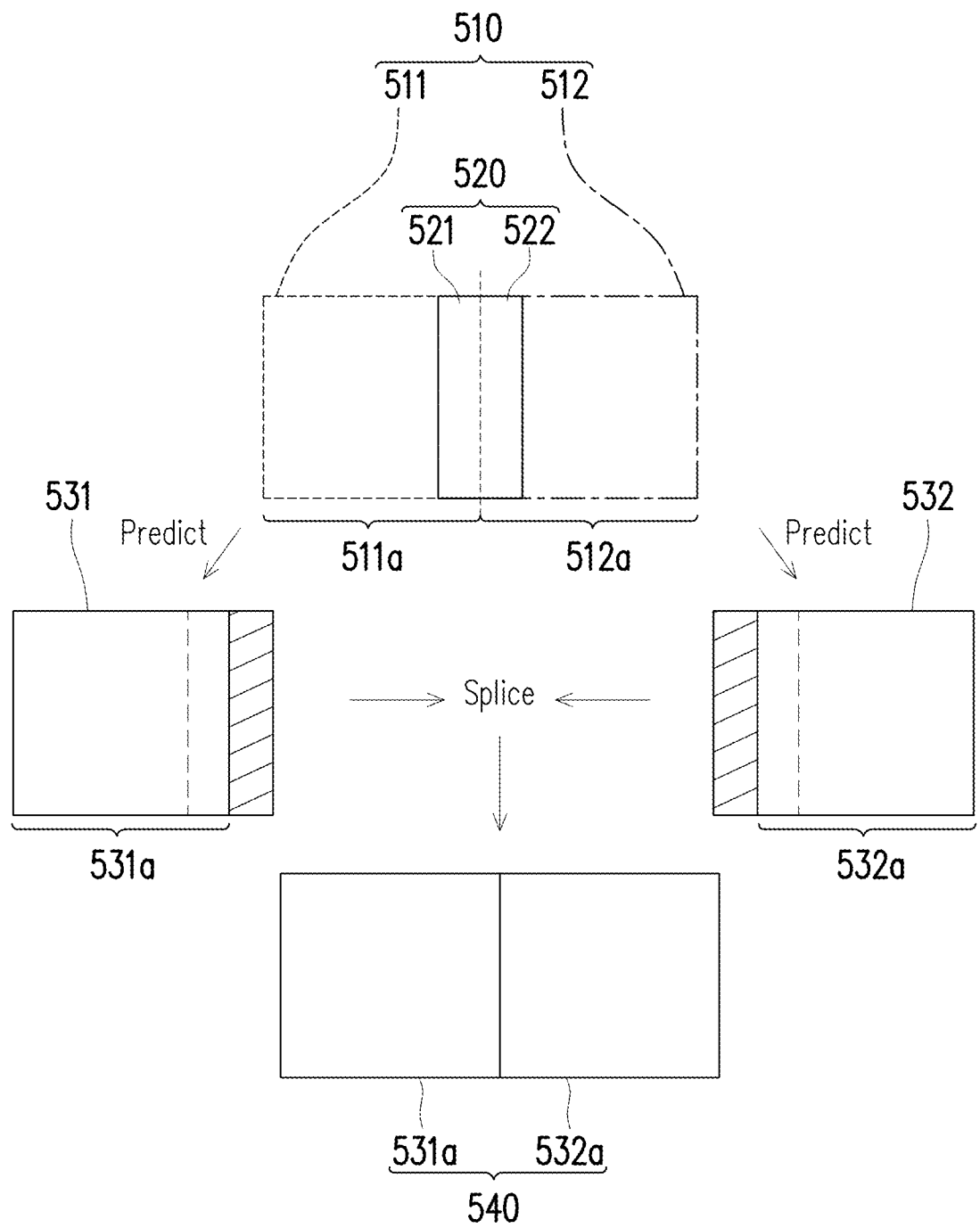
FIG. 5 is a diagram showing an application scenario according to an embodiment of the disclosure.

In FIG. 5, the to-be-predicted image 510 may, for example, include a plurality of to-be-predicted objects (not shown). By appropriately selecting CW and W, among other parameters, a width of the first overlap region 520 (which is a rectangular region, for example) may be adjusted to a predetermined multiple (e.g., 3 times) of an average width of the to-be-predicted objects. Nonetheless, the disclosure is not limited thereto.

After that, in step S420, the processor 104 may divide the first overlap region 520 into a first sub-overlap region 521 closer to the first cropped image 511 and a second sub-overlap region 522 closer to the second cropped image 512.

In FIG. 5, the processor 104 may, for example, define a half of the first overlap region 520 that is closer to the first cropped image 511 as the first sub-overlap region 521, and define another half of the first overlap region 520 that is closer to the second cropped image 512 as the second sub-overlap region 522. In other embodiments, the processor 104 may also define a first sub-overlap region and a second sub-overlap region in the first overlap region 520 in other manners depending on the needs of the designer.

Then, in step S430, the processor 104 may find a first image region 511a that does not include the second sub-overlap region 522 in the first cropped image 511, and find a second image region 512a that does not include the first sub-overlap region 521 in the second cropped image 512.

In FIG. 5, the first image region 511a is, for example, an image region remaining after the second sub-overlap region 522 is removed from the first cropped image 511, and the second image region 512a is, for example, an image region remaining after the first sub-overlap region 521 is removed from the second cropped image 512. Nonetheless, the disclosure is not limited thereto.

In step S440, the processor 104 may individually perform a prediction operation on the first cropped image 511 and the second cropped image 512 to generate a first prediction result image 531 and a second prediction result image 532 respectively corresponding to the first cropped image 511 and the second cropped image 512.

In an embodiment, the processor 104 may, for example, input the first cropped image 511 into a pre-trained neural network to generate the first prediction result image 531 through the neural network. For example, after the neural network identifies one or more to-be-predicted objects in the first cropped image 511, in the first prediction result image 531, the neural network may represent pixels corresponding to the to-be-predicted objects using a first value, and represent pixels not corresponding to the to-be-predicted objects using a second value. Nonetheless, the disclosure is not limited thereto. Similarly, the processor 104 may input the second cropped image 512 into the neural network to generate the second prediction result image 532 through the neural network, of which details will not be repeatedly described herein.

In step S450, the processor 104 may find a first prediction image region 531a corresponding to the first image region 511a in the first prediction result image 531, and find a second prediction image region 532a corresponding to the second image region 512a in the second prediction result image 532.

After that, in step S460, the processor 104 may splice at least the first prediction image region 531a and the second prediction image region 532a into a spliced image 540. A first relative position between the first prediction image region 531a and the second prediction image region 532a in the spliced image 540 corresponds to a second relative position between the first image region 511a and the second image region 512a in the to-be-predicted image 510.

Specifically, in the to-be-predicted image 510, since the first image region 511a is closely adjacent to the second image region 512a on the left side (i.e., the second relative position), in the spliced image 540, the first prediction image region 531a is also closely adjacent to the second prediction image region 532a on the left side (i.e., the first relative position).

From another point of view, the above step may be interpreted as respectively removing the parts (i.e., the regions illustrated with slanted lines) corresponding to the second sub-overlap region 522 and the first sub-overlap region 521 from the first prediction result image 531 and the second prediction result image 532, and splicing the remaining parts in the first prediction result image 531 and the second prediction result image 532 into the spliced image 540. Thereby, the spliced image 540 has relatively low distortion.

Figure 6A:
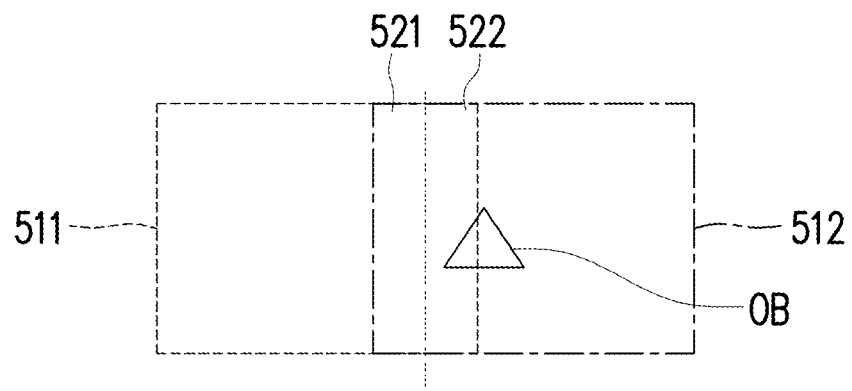
FIG. 6A to FIG. 6C are schematic diagrams of a plurality of prediction scenarios according to FIG. 5.
Figure 6B:
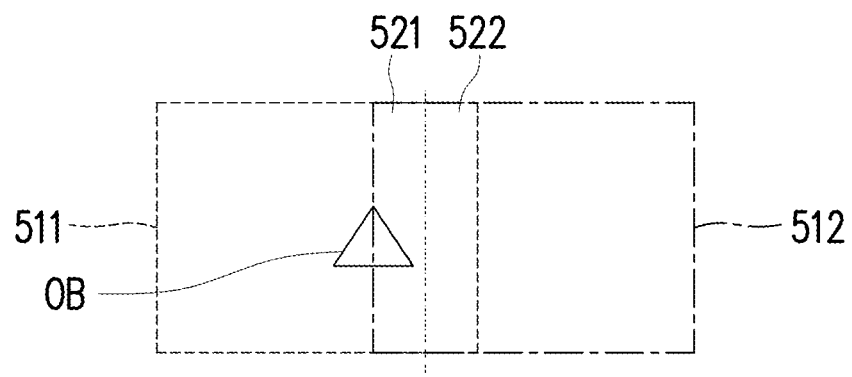
Figure 6C:
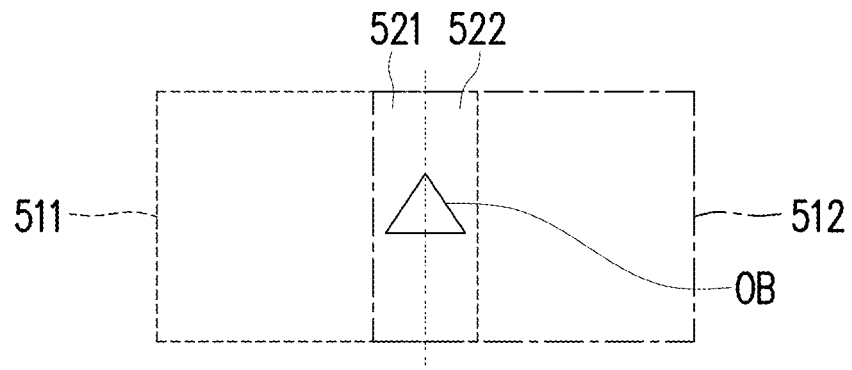

With reference to FIG. 6A to FIG. 6C, which are schematic diagrams of a plurality of prediction scenarios according to FIG. 5, it is assumed in FIG. 6A that only part of the to-be-predicted object OB is located in the first cropped image 511. In this case, since the to-be-predicted object OB is not completely presented in the first cropped image 511, it is possible that the neural network fails to identify the to-be-predicted object OB in the first cropped image 511, and correspondingly, the to-be-predicted object OB is also not presented in the first prediction result image 531.

However, since the to-be-predicted object OB is completely presented in the second cropped image 512, the neural network should be able to successfully identify the to-be-predicted object OB in the second cropped image 512. Correspondingly, the to-be-predicted object OB may be presented in the second prediction result image 532. Therefore, after steps S450 and S460 are executed, information of the to-be-predicted object OB is correspondingly retained in the generated spliced image 540.

In FIG. 6B, it is assumed that only part of the to-be-predicted object OB is located in the second cropped image 512. In this case, since the to-be-predicted object OB is not completely presented in the second cropped image 512, it is possible that the neural network fails to identify the to-be-predicted object OB in the second cropped image 512, and correspondingly, the to-be-predicted object OB is also not presented in the second prediction result image 532.

However, since the to-be-predicted object OB is completely presented in the first cropped image 511, the neural network should be able to successfully identify the to-be-predicted object OB in the first cropped image 511. Correspondingly, the to-be-predicted object OB may be presented in the first prediction result image 531. Therefore, after steps S450 and S460 are executed, the information of the to-be-predicted object OB is correspondingly retained in the generated spliced image 540.

In FIG. 6C, it is assumed that the to-be-predicted object OB is located in the middle of the first overlap region 520. In this case, since the to-be-predicted object OB is presented relatively completely in the first cropped image 511 and the second cropped image 512, the neural network should be able to successfully identify the to-be-predicted object OB in the first cropped image 511 and the second cropped image 512. Correspondingly, the to-be-predicted object OB may be presented in both the first prediction result image 531 and the second prediction result image 532. Therefore, after steps S450 and S460 are executed, the information of the to-be-predicted object OB is correspondingly retained in the generated spliced image 540.

Figure 7A:
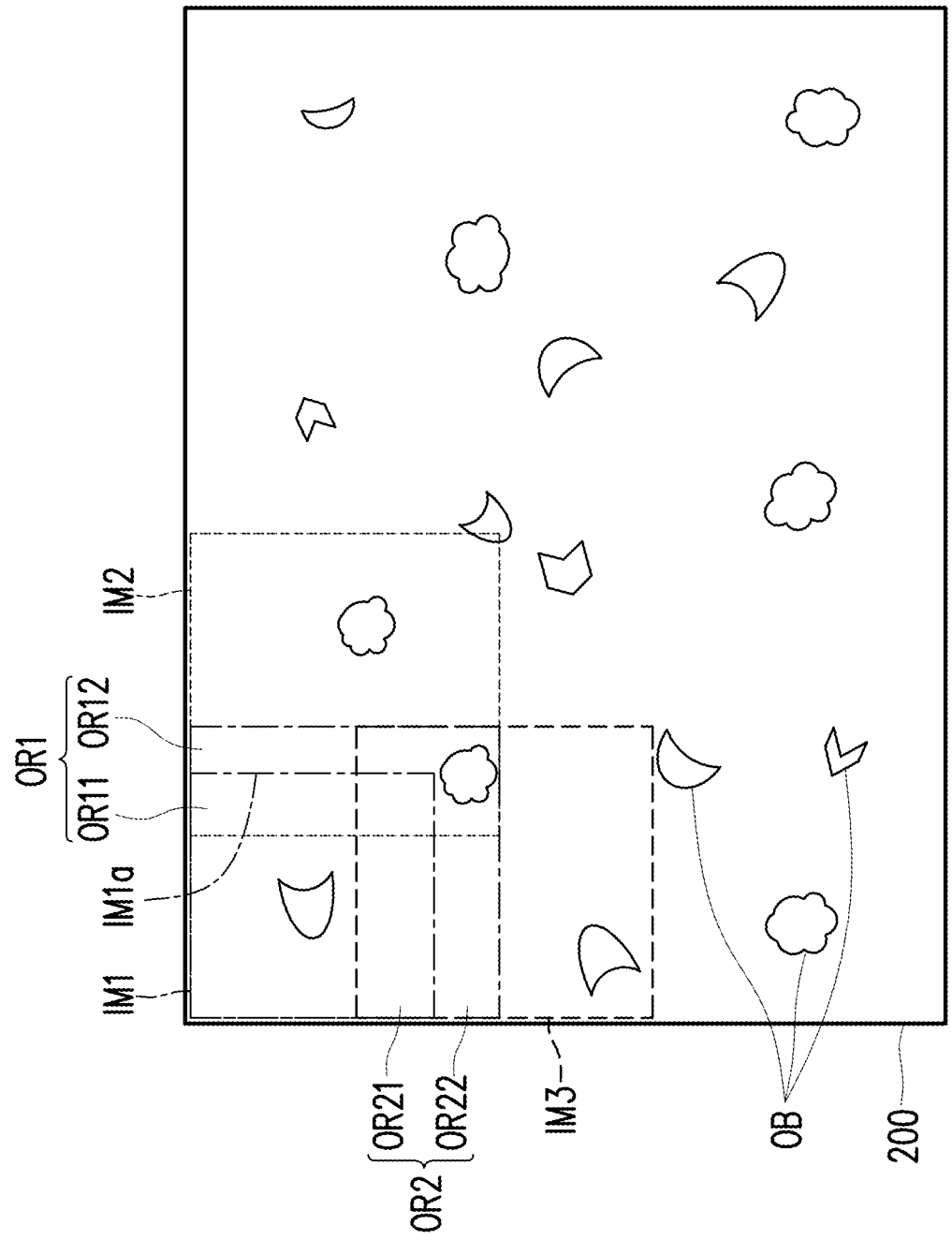
FIG. 7A to FIG. 7D are diagrams of a plurality of application scenarios according to FIG. 2.

Reference may be made to FIG. 7A to FIG. 7D, which are diagrams of a plurality of application scenarios according to FIG. 2. In FIG. 7A, after the to-be-predicted image 200 is divided into a plurality of cropped images, the processor 104 may find a required image region in each cropped image based on the relevant teaching of FIG. 4 and FIG. 5, and accordingly find a prediction image region for generating a spliced image in a corresponding prediction result image.

In FIG. 7A, the processor 104 may divide the first overlap region OR1 between the first cropped image IM1 and the second cropped image IM2 into a first sub-overlap region OR11 and a second sub-overlap region OR12. In addition, since the second overlap region OR2 exists between the first cropped image IM1 and the third cropped image IM3, the processor 104 may divide the second overlap region OR2 into a third sub-overlap region OR21 and a fourth sub-overlap region OR22.

Therefore, after a first image region IM1*a* in the first cropped image IM1 is determined based on the first cropped image IM1 and the second cropped image IM2, the processor 104 may further remove the fourth sub-overlap region OR22 from the first image region IM1*a* to form the first image region IM1*a* shown in FIG. 7A.

Based on the above, after generating a first prediction result image corresponding to the first cropped image IM1, the processor 104 finds the first prediction image region adapted to form the spliced image in the first prediction result image according to the first image region IM1 *a* shown in FIG. 7A.

Figure 7B:
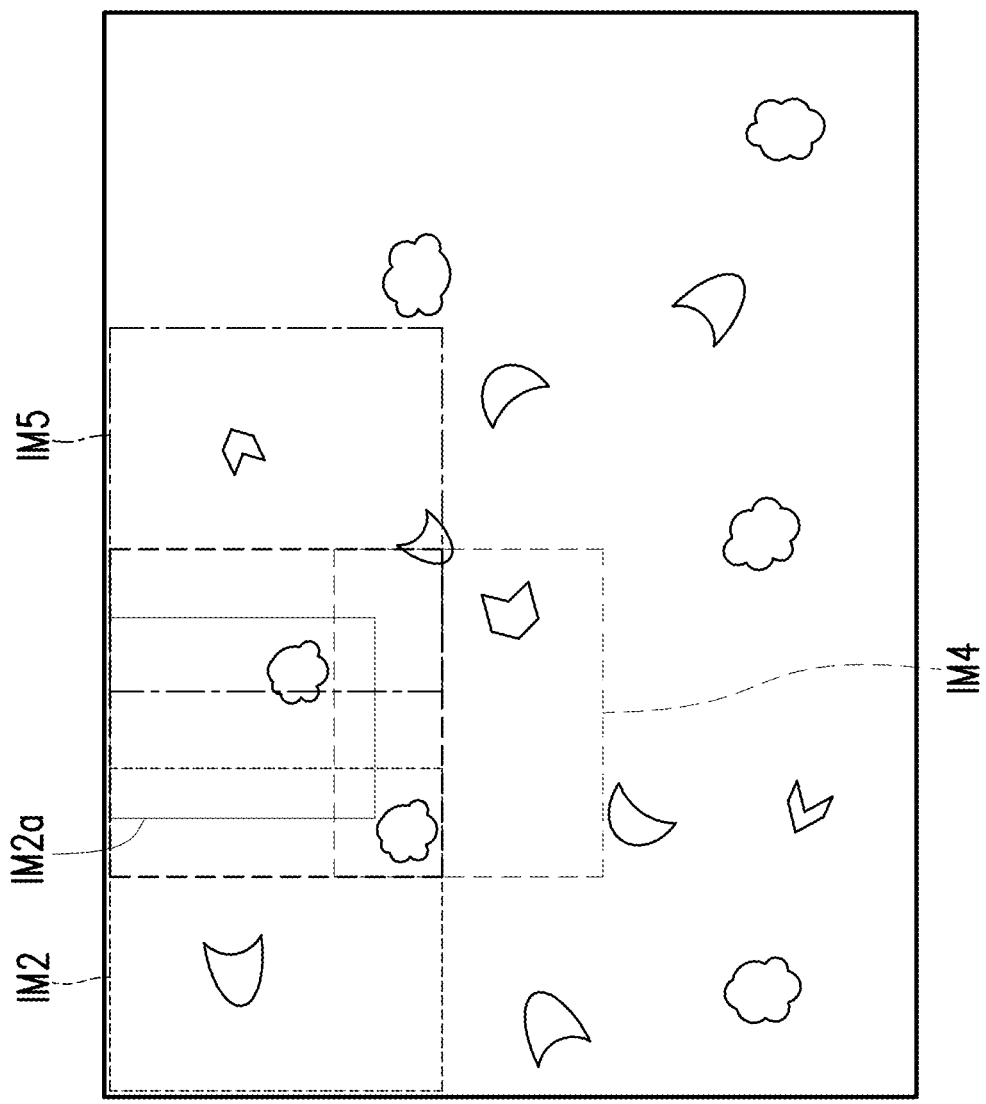

In FIG. 7B, since other cropped images also exists on the right side of and below the second cropped image IM2, the processor 104 may find the overlap regions between the second cropped image IM2 and the surrounding cropped images (i.e., the first cropped image IM1, a fourth cropped image IM4, and a fifth cropped image IM5) based on the above teachings, and remove parts of the overlap regions closer to the surrounding cropped images from the second cropped image IM2. Thereby, a second image region IM2*a* shown in FIG. 7B is formed.

After generating a second prediction result image corresponding to the second cropped image IM2, the processor 104 may find the second prediction image region adapted to form the spliced image in the second prediction result image according to the second image region IM2*a* shown in FIG. 7B.

In addition, for the third image IM3, the processor 104 may also find the overlap regions between the third cropped image IM3 and the surrounding cropped images (e.g., the first cropped image IM1, the second cropped image IM2, etc.) based on the above mechanism, and remove parts of the overlap regions closer to the surrounding cropped images from the third cropped image IM3. Thereby, a third image region IM3*a* corresponding to the third cropped image IM3 is formed.

After generating a third prediction result image corresponding to the third cropped image IM3, the processor 104 may find the third prediction image region adapted to form the spliced image in the third prediction result image according to the third image region IM3*a*.

Figure 7C:
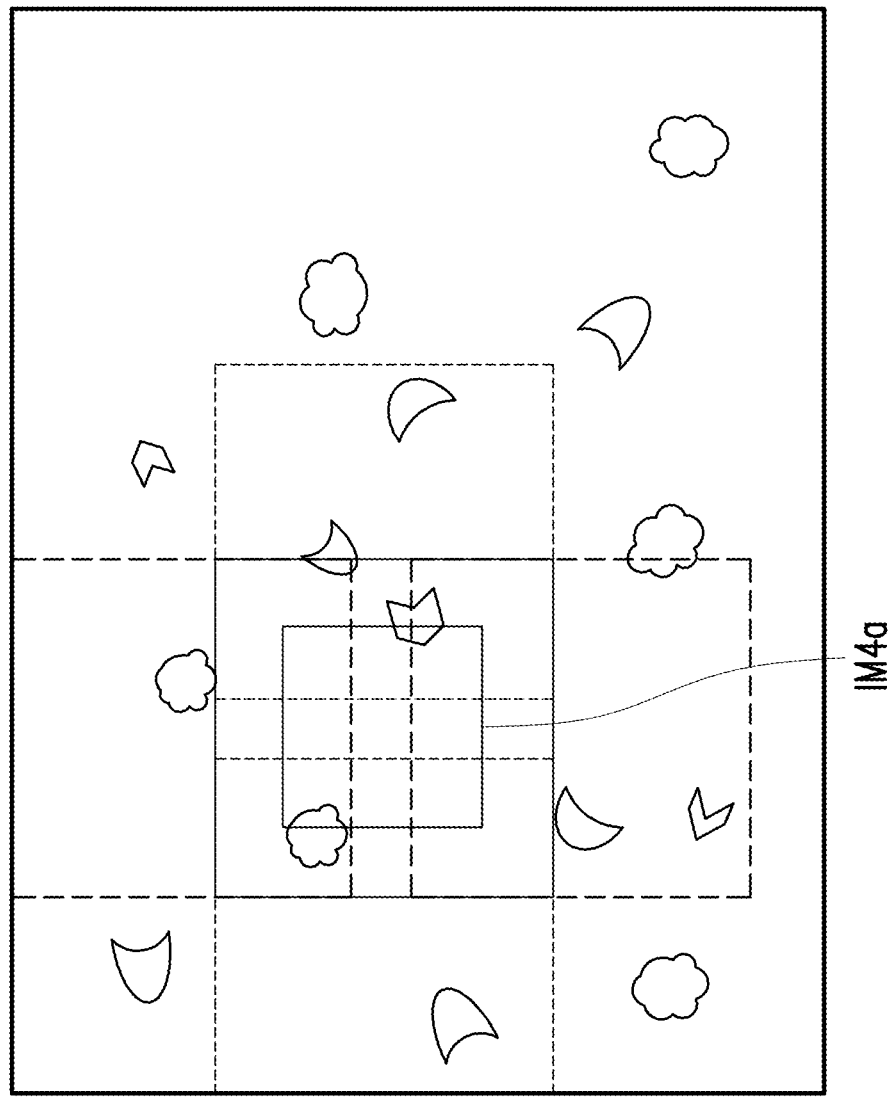

In FIG. 7C, based on the above mechanism, the processor 104 may also find the overlap regions between the fourth cropped image IM4 and the surrounding cropped images (e.g., the first cropped image IM1, the second cropped image IM2, the third cropped image IM3, the fifth cropped image IM5, etc.), and remove parts of the overlap regions closer to the surrounding cropped images from the fourth cropped image IM4. Thereby, a fourth image region IM4*a* corresponding to the fourth cropped image IM4 is formed.

After generating a fourth prediction result image corresponding to the fourth cropped image IM4, the processor 104 may find the fourth prediction image region adapted to form the spliced image in the fourth prediction result image according to the fourth image region IM4*a*.

Figure 7D:
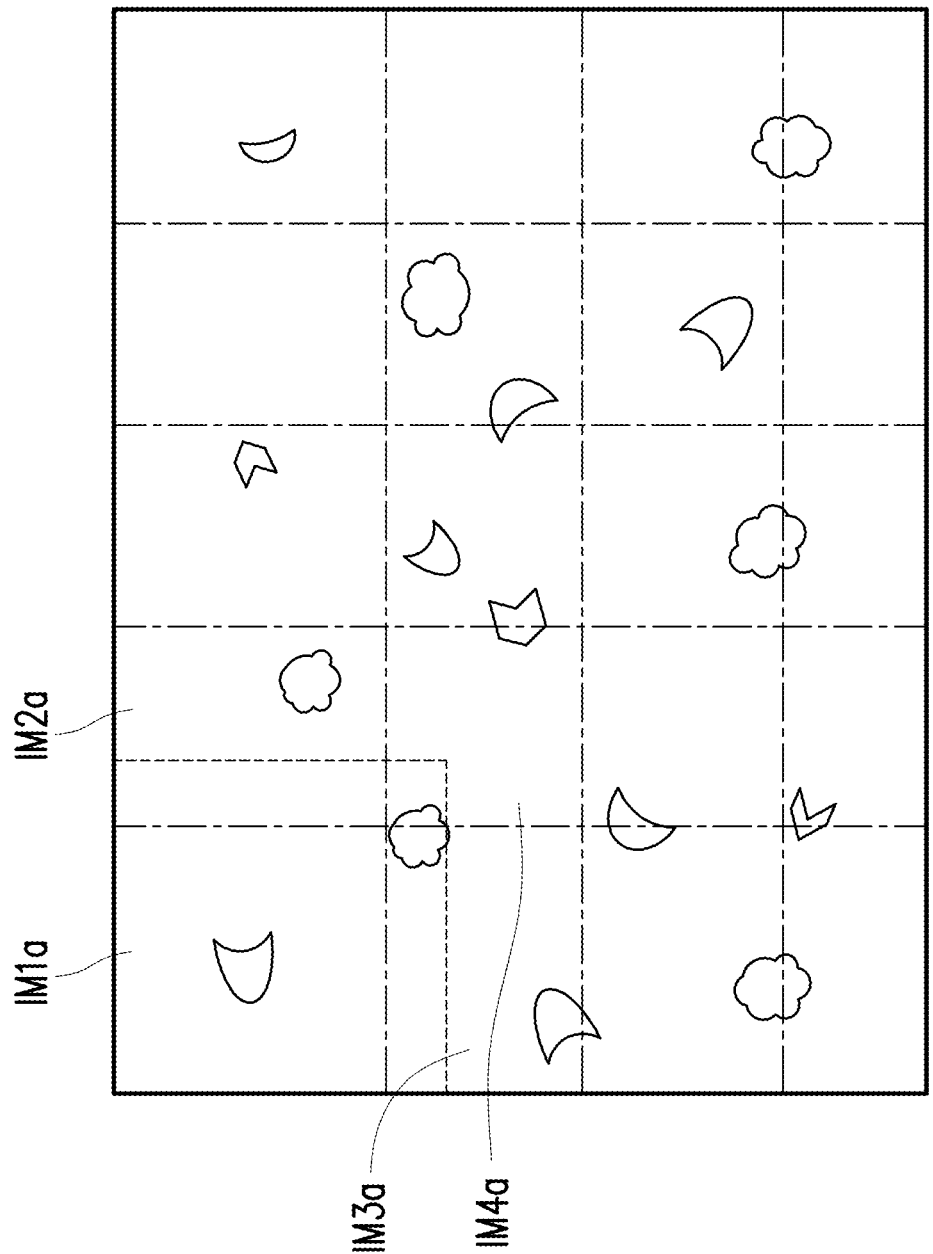

After the above operations are performed on each of the cropped images in the to-be-predicted image 200, the image regions corresponding to the cropped images may be presented as each of areas illustrated with broken line as shown in FIG. 7D. Based on this, after obtaining the prediction result images corresponding to the cropped images, the processor 104 may find the required prediction image regions in each of the prediction result images according to FIG. 7D to be spliced to form the required spliced image. Thereby, the information of each to-be-predicted object OB is retained in the spliced image with low distortion.

Figure 8:
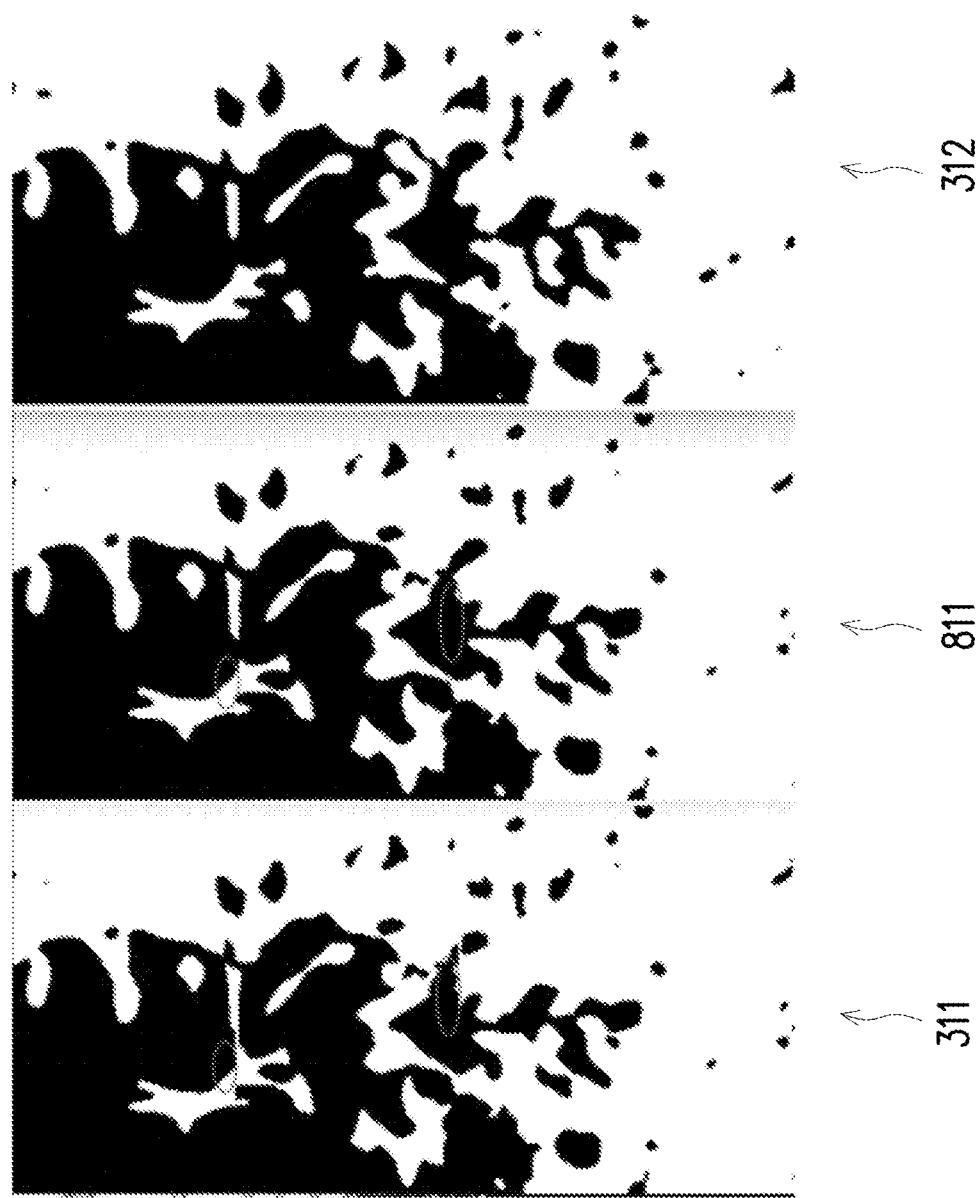
FIG. 8 is a comparison diagram of a spliced image according to in FIG. 3.

With reference to FIG. 8, which is a comparison diagram of a spliced image according to in FIG. 3, a spliced image 811 in FIG. 8 is, for example, a splicing result generated by the method of the disclosure. As shown by the spliced image 311, the spliced image 312, and the spliced image 811, the spliced image 811 is more similar to the spliced image 312 than the spliced image 311.

In summary of the foregoing, in the disclosure, since the image region where the information of the to-be-predicted object may be retained is found in each of the cropped images, and accordingly the prediction image regions are found in the prediction result images corresponding to the cropped images, the information of each to-be-predicted objects is relatively accurately presented in the spliced image formed by splicing the prediction image regions, thereby reducing distortion caused by splicing.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image splicing method adapted for an image processing device, the method comprising:

obtaining a to-be-predicted image, and dividing the to-be-predicted image into at least a first cropped image and a second cropped image, wherein a first overlap region exists between the first cropped image and the second cropped image, wherein coordinates of an upper left corner pixel of the first cropped image in the to-be-predicted image are $(x_a,y)$ and coordinates of an upper left corner pixel of the second cropped image in the to-be-predicted image is $(x_b,y_b)$, where $y_a=y_b$, $x_b-x_a=CW$, and CW is a horizontal movement range;

dividing the first overlap region into a first sub-overlap region and a second sub-overlap region, wherein the first overlap region is closer to the first cropped image than the second cropped image, and the second sub-overlap region is closer to the second cropped image than the first cropped image;

finding, in the first cropped image, a first image region not comprising the second sub-overlap region in the first cropped image, and finding, in the second cropped image, a second image region not comprising the first sub-overlap region in the second cropped image;

individually performing a prediction operation on the first cropped image and the second cropped image to generate a first prediction result image and a second prediction result image respectively corresponding to the first cropped image and the second cropped image;

finding a first prediction image region corresponding to the first image region in the first prediction result image, and finding a second prediction image region corresponding to the second image region in the second prediction result image; and splicing at least the first prediction image region and the second prediction image region into a spliced image, wherein a first relative position between the first prediction image region and the second prediction image region in the spliced image corresponds to a second relative position between the first image region and the second image region in the to-be-predicted image.

2. The method as described in claim 1, wherein the first overlap region is a rectangular region, the to-be-predicted image comprises at least one to-be-predicted object, the at least one to-be-predicted object has an average width, and a width of the first overlap region is at least a predetermined multiple of the average width.

3. The method as described in claim 1, wherein the step of dividing the first overlap region into the first sub-overlap region closer to the first cropped image and the second sub-overlap region closer to the second cropped image comprises:

defining a half of the first overlap region closer to the first cropped image as the first sub-overlap region, and defining another half of the first overlap region closer to the second cropped image as the second sub-overlap region.

4. The method as described in claim 1, wherein the to-be-predicted image comprises at least one to-be-predicted object, a pixel corresponding to the at least one to-be-predicted object in the first prediction result image and the second prediction result image is set to a first value, and a pixel non-corresponding to the at least one to-be-predicted object in the first prediction result image and the second prediction result image is set to a second value.

5. The method as described in claim 1, wherein the to-be-predicted image is further divided into a third cropped image, a second overlap region exists between the first cropped image and the third cropped image, and the method further comprises:

dividing the second overlap region into a third sub-overlap region closer to the first cropped image and a fourth sub-overlap region closer to the third cropped image, and removing the fourth sub-overlap region from the first image region;

finding a third image region not comprising the third sub-overlap region in the third cropped image;

performing a prediction operation on the third cropped image to generate a third prediction result image corresponding to the third cropped image;

finding a third prediction image region corresponding to the third image region in the third prediction result image; and generating the spliced image based on at least the first prediction image region, the second prediction image region, and the third prediction image region, wherein a third relative position between the first prediction image region and the third prediction image region in the spliced image corresponds to a fourth relative position between the first image region and the third image region in the to-be-predicted image.

6. The method as described in claim 5, wherein coordinates of an upper left corner pixel of the third cropped image in the to-be-predicted image are $(x_c, y_c)$, where $x_a=x_c$, $y_c-y_a=CH$, and CH is a vertical movement range.

* * * * *